United States Patent Office 3,442,628
Patented May 6, 1969

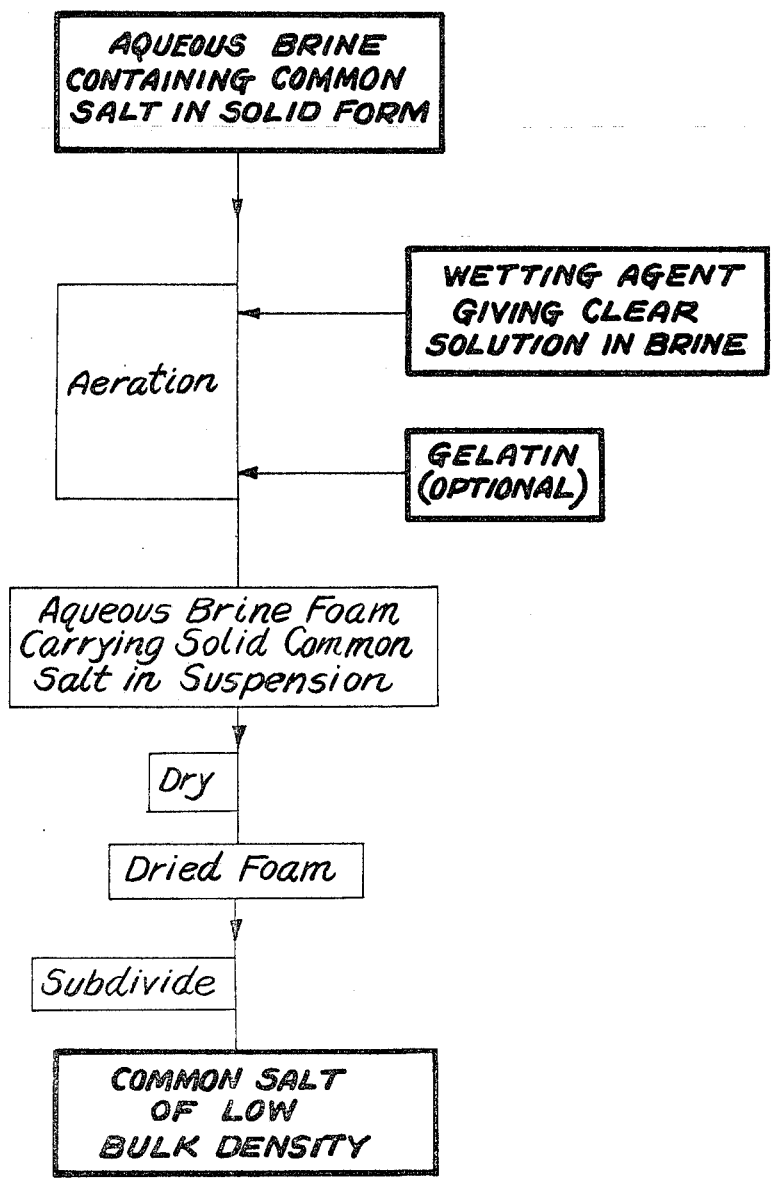

3,442,628
LOW BULK DENSITY SALT USING CATIONIC SURFACE-ACTIVE AGENTS
James Saunders and Stewart Ernest Crow, Edinburgh, Scotland, assignors to Cerebos Foods Limited, London, England, a British company
Filed Apr. 14, 1966, Ser. No. 542,453
Claims priority, application Great Britain, Apr. 22, 1965, 17,054/65
Int. Cl. B01t *17/06, 17/02*
U.S. Cl. 23—300                                                11 Claims

ABSTRACT OF THE DISCLOSURE

Common salt of low bulk density is prepared by foaming brine containing common salt in suspension and a wetting agent soluble therein to give a clear solution of reduced surface tension, drying the foam and then subdividing it into particles. The wetting agent at least partly stabilises the foam and gelatin may also be added to the brine to assist in stabilising it.

---

This invention relates to a process for the production of crystalline common salt of low bulk density.

Common salt, sodium chloride, is produced commercially in a number of crystalline forms, principally as open-pan salt and so-called vacuum salt. Open-pan salt is formed by the evaporation of brine in shallow pans which are open to the atmosphere at the top and are generally heated from below. This system causes the brine at the surface to concentrate, the crystals tending to grow from below in an irregular manner until their weight overcomes the surface tension supporting them and they sink to the bottom of the pan. The irregular shape of the crystals causes them to pack together badly and open-pan salt is characterised by low bulk density, for example about 0.7 gm./cc. The open-pan production of salt is however expensive to operate.

Vacuum salt is generally formed by evaporating brine in multiple effect vacuum evaporators, the brine being initially purified for example to remove calcium and magnesium ions which would otherwise cause scaling inside the evaporators. This method normally produces salt in the form of small cubic crystals which, by packing together well, tend to give a product of high bulk density, for example 1.0 gm./cc. This type of process is generally more economical than the open-pan process and is widely used commercially.

In British patent specification No. 1,016,743 there is described a process whereby cubically crystalline salt, in particular vacuum salt, can be given a low bulk density. The process comprises in effect forming a foam carrying the vacuum salt crystals in suspension, the foam then being dried and subdivided into irregularly shaped particles having bulk properties comparable with those of open-pan salt. The use of foam appears to prevent the cubic salt from agglomerating in a close compact manner. It is possible to form similar low bulk density salt from forms of salt other than cubic vacuum salt, for example waste open-pan or vacuum salt in which the crystals have been broken into small particles.

In the process of British patent specification No. 1,016,743 the foam is conveniently stabilised by incorporation therein of a foam stabiliser. A particularly convenient stabiliser is gelatin and the amount necessary to give effective stabilisation depends upon the ratio of common salt to water in the foam. Gelatin is a relatively expensive substance, and it is one object of the present invention to provide a process for producing a low bulk density salt by the foaming technique wherein the amount of gelatin required to provide a stable foam may be substantially reduced or indeed the use of gelatin avoided.

According to one feature of the present invention, there is provided a process for the production of particulate low bulk density common salt which comprises forming an aqueous foam carrying common salt in suspension and then drying and subdividing the foam into particles, there being incorporated into the liquid from which the foam is prepared a wetting agent which is soluble in brine to give a clear solution having a reduced surface tension and which serves at least in part to stabilise the foam.

According to another feature of the present invention, there is provided a process for the production of low bulk density coherent masses of common salt, particularly so-called "cut-lump" salt, which comprises forming an aqueous foam carrying common salt in suspension and thereafter forming the foam into the desired shape and drying, there being incorporated into the liquid from which the foam is prepared a wetting agent which is soluble in brine to give a clear solution having a reduced surface tension and which serves at least in part to stabilise the foam.

The process according to the invention may be applied to various forms of solid salt, e.g., open-pan salt and dendritic salt. The process is however of particular application to vacuum salt from which it is possible by the process according to the invention to prepare a product simulating open-pan salt.

In processes according to the invention, the liquid from which the foam is prepared may if desired contain (1) a foam stabiliser such as gelatin, and (2) a wetting agent as hereinbefore defined. In such processes, the wetting agent is serving in part to stabilise the foam.

However, it is possible for the wetting agents in the processes according to the invention to serve alone as foam stabilisers without the use of additional foam stabilisers such as gelatin if they are used in sufficiently high concentrations. In such cases, the liquid from which the foam is prepared can consist of water and wetting agent alone, the salt preferably being suspended in the liquid prior to foaming. Where for example gelatin is used as foam stabiliser in addition to the wetting agent, we have observed a synergestic effect resulting from the use of gelatin with wetting agents such as "Vantoc AL" described below. In other words increased reductions in bulk density are obtained by the use of gelatin in combination with "Vantoc AL" as compared with the results obtained where the gelatin is replaced by a further equivalent weight of "Vantoc AL" as foam stabiliser. Also, the reductions in bulk density obtained with a combination of gelatin and "Vantoc AL" are larger than could have been predicted from the results obtainable by using gelatin and "Vantoc AL" separately.

As stated above, the wetting agent should be one soluble in brine to give a clear solution having a reduced surface tension and therefore suitable wetting agents may be selected by means of a simple experimental test. We have found that cationic wetting agents (e.g., quaternary ammonium compounds) and anionic wetting agents may be used; the following groups of compounds are particularly suitable:

(a) Cationic surface-active agents of the formula $$R(CH_3)_3N^+X^-$$

where R is a straight- or branched-chain alkyl group containing from 12 to 16 carbon atoms and X is either a chloride or bromide ion. Mixtures of such compounds are also effective.

One such compound is that sold by Imperial Chemical Industries Limited under the trade mark "Vantoc AL," which product is an aqueous blend of alkyl-trimethylammonium bromide containing 10% of the active agent.

(b) Cationic surface-active agents of the formula $$R_1-\overset{\overset{CH_3}{|}}{\underset{|}{N}}-(OC_2H_4)_bHO\overline{S}O_3R_2$$
$$(OC_2H_4)_aH$$

where $R_1=C_{17}H_{35}$; $R_2=CH_3$ or $C_2H_5$; and both $a$ and $b$ represent integers less than 4.

(c) Anionic surface-active agents of the type:

$$R_3SO_4Na$$

where $R_3$ is a straight- or branched-chain alkyl group containing from 6 to 12 carbon atoms.

(d) Anionic surface-active agents known as sodium salts of sulphated ethoxylated fatty alcohols, such as are available under the proprietary name "Solumin."

The proportion of wetting agent used (where a separate foam stabiliser such as gelatin is employed) should be sufficient to effect a substantial reduction in the surface tension of brine. With the product "Vantoc AL," about 0.014% of the active agent (i.e., 0.14% of the aqueous blend) based upon the weight of the common salt has been found to be a convenient amount. In general, the proportion of wetting agent will preferably be from 0.005% to 0.3%, advantageously from 0.01 to 0.15%, by weight based upon the weight of salt. Where the wetting agent is to serve alone as foam stabiliser, a larger proportion will in general be preferably used. However good results have been obtained using as little as 0.2% "Vantoc AL" (about 0.02% active agent).

The amount of foam stabiliser such as gelatin used in the process according to the invention can be substantially reduced as compared with that used in the process described in British patent specification No. 1,016,743. For example, a series of tests have been carried out in which aqueous suspensions of common salt containing gelatin have been foamed. In most of the tests the wetting agent "Vantoc AL" was incorporated into the aqueous foam; in one test it was omitted. The results are summarised in the following table (in which all percentages are by weight based upon the weight of the common salt):

| Experiment No. | Percent gelatin | Percent Vantoc AL solution | Percent water | Bulk density mix | Bulk density (after drying) |
|---|---|---|---|---|---|
| 1 | 0.15 | 0.14 | 9 | 0.38 | 0.30 |
| 2 | 0.10 | 0.14 | 9 | 0.43 | 0.34 |
| 3 | 0.05 | 0.14 | 9 | 0.49 | 0.36 |
| 4 | | 0.14 | 9 | 1.08 | 0.78 |
| 5 | 0.05 | | 9 | 1.11 | |

These tests illustrate that, where 0.14% by weight of "Vantoc AL" is incorporated into the aqueous suspension, the percentage of gelatin can be reduced from 0.15% to 0.05% with only a very small and insignificant increase in the bulk density of the product.

The proportions of common salt, liquid, and foam stabiliser such as gelatin which give best results in the processes according to the invention depend upon the nature of the materials used. In general the preferred weight ratio of liquid to solid material lies between 7:93 and 18:82, more advantageously between 8:92 and 16:84. The optimal ratio of foam stabiliser to common salt tends to vary with the liquid/solid ratio and the nature of the foam stabiliser and where the foam stabiliser is gelatin the preferred ratio of gelatin to solid material lies between 0.01:99.99 and 0.25:99.75 when the liquid/solid ratio is about 8:92 and between 0.20:99.80 and 0.50:99.50 when the liquid/solid ratio is about 18:82. In general, the proportion of foam stabiliser such as gelatin used will advantageously be from 0.01 to 0.50%, especially from 0.05 to 0.35%, based on the weight of solid salt.

The foam may be formed, for example, by vigorous agitation in a gas atmosphere, e.g., whisking in air. Alternatively a gas such as air at, about or below atmospheric pressure may be bubbled through the liquid. The foam may also be produced by gas generated by gas-producing chemical substances such as sodium bicarbonate or ammonium bicarbonate. The common salt may be dispersed in the foam after formation thereof but is preferably present as a suspension in the liquid during the foam step in order to simplify the procedure.

In British patent specification No. 1,016,742, a process is described in which dendritic salt which is of low hygroscopicity can be made to assume one of the advantageous bulk properties of open-pan salt, namely high angle of repose, by introducing on to the surface of the salt crystals a humectant substance such as magnesium or calcium chloride or polyhydric alcohols such as glycerol or sorbitol. We have found that the treatment of low bulk density salt obtained according to the present invention with a humectant allows of the production of a form of salt which imitates many of the valuable properties of openpan salt. Magnesium chloride is the preferred humectant.

In the present process, the humectant may be applied to the surface of the solid salt, e.g., by spraying, in the form of an aqueous solution or dispersion after drying and preferably after subdivision of the foam but may also be incorporated in the liquid used to produce the foam. A concentration of from 0.05 to 1%, conveniently 0.1 to 0.5%, by weight of humectant based upon the weight of common salt is preferably used.

The process according to the invention enables the bulk density of particulate common salt to be reduced from a relatievly high value of about 1.0 gm./cc. down to 0.6 gm./cc. or even lower. The foam in the wet or dry state is generally of lower bulk density in the lump form than in the particulate form achieved by breaking up the dry foam and in order to produce particulate salt of bulk density 0.6 to 0.8 gm./cc. the wet foam should have a bulk density of about 0.5 gm./cc. In general it is possible to use the bulk density of the wet foam to determine when the foaming stage has reached completion.

In the production of particulate material the foam can be dried during or after subdivision. For example the wet foam may be subjected to a jet or jets of a hot gas, e.g., air which breaks up the foam into particles at the same time drying the latter. Alternatively, the wet foam may be subdivided, e.g., by flicking the surface with revolving blades, the particles then being dried with a hot gas. In another procedure the wet foam may be layed out in trays in a suitable drying apparatus and dried in a current of warm air. In large scale production it is advantageous to dry continuously on a belt. Where the foam is dried without subdivision it may subsequently be broken up by any convenient gentle size reduction process which serves to reduce the particle size to the desired value without however reducing the crystals to their ultimate cubic form. The size reduction may for example be effected by gentle cogmilling to give for example particles similar in dimensions to those of open-pan salt.

In the application of the present process to the production of particulate common salt it is generally preferred to produce particles of a particle size of from 0.1 to 1.5 mm.

As stated above in accordance with one feature of the process according to the invention the wet foam can be moulded into desired shapes before drying. In particular, open pan salt is often sold in the form of cut lumps prepared by sawing up caked masses, and the present process affords a simple means of producing a similar product. Since moulding is employed, the waste originating from a sawing step is avoided. Other desirable shapes may be obtained, if desired, and the foam may be extruded rather than moulded.

Moulded shapes can also be obtained from the particulate material produced in accordance with the invention, and for example in the produtcion of lump salt this can be more economical than the direct moulding of the wet foam. The dry particulate material may thus be damped slightly, moulded to the desired shape under pressure and then dried.

The drawing shows a flow sheet setting forth the process in block diagram form.

In order that the invention may be well understood we give the following examples by way of illustration only:

Example 1

480 g. vacuum salt are placed in a bowl whipper along with 69 g. saturated brine in which has been dissolved 0.75 g. gelatin and 0.75 g. "Vantoc AL," the latter containing 10% active wetting agent. This mixture is whipped for 10 minutes and the resultant foam oven-dried for 4 hours at 120° C. The dried foam is crushed, the crushed product having a bulk density of 0.43 g./ml.

Example 2

Undried vacuum salt containing 3% moisture was conveyed by a screw conveyor at the rate of 200 lb./hour into a continuous whipper. At the same time, saturated brine containing 0.012 lb./litre of gelatin, and the same concentration of dodecyltrimethylammonium bromide, is pumped in at the rate of 8.35 litres/hour. The foam produced by the action of the continuous whipper on this mixture is dried on a continuous belt drier. The crushed, dried product has a bulk density of 0.54 g./ml.

Example 3

48 g. of water are saturated with common salt and placed in a whipper with 480 g. vacuum salt and 1 g. of "Vantoc AL." This mixture is whipped for 5 minutes and the resultant foam oven-dried for 4 hours at 120° C. The dried foam is crushed to yield a product having a bulk density of 0.60 g./ml.

Example 4

480 g. of vacuum salt are placed in a bowl whipper along with 69 g. saturated brine in which have been dissolved 0.25 g. gelatin and 0.75 g. of diethoxymethyl-stearylammonium methylsulphate (a wetting agent of the general formula given in (b) above). This mixture is whipped for 10 minutes and the resultant foam oven-dried for 4 hours at 120° C. The dried foam is crushed, the crushed product having a bulk density of 0.41 g./ml.

Example 5

480 g. vacuum salt are placed in a bowl whipper along with 69 g. saturated brine in which have been dissolved 0.75 g. gelatin and 0.75 g. "Solumin" T95S, a material containing 32% of sodium salt of sulphated ethoxylated fatty alcohols as active ingredient. This mixture is whipped for 10 minutes and the resultant foam oven-dried for 4 hours at 120° C. The dried foam is crushed, the crushed product having a bulk density of 0.62 g./ml.

Example 6

480 g. vacuum salt are placed in a bowl whipper along with 69 g. saturated brine in which have been dissolved 0.25 g. gelatin and 0.75 g. sodium lauryl sulphate. This mixture is whipped for 10 minutes, and the resultant foam oven-dried for 4 hours at 120° C. The dried foam is crushed, the crushed product having a bulk density of 0.72 g./ml.

Example 7

480 g. vacuum salt are placed in a bowl whipper along with 69 g. saturated brine in which has been dissolved 0.75 g. gelatin and 0.75 g. "Vantoc AL." This mixture is whipped for 10 minutes and the resultant foam is poured into a rectangular mould. The mould is dried at 120° C. for four hours and, after cooling, the dried block is removed from the mould. The block has a bulk density of 0.62 g./ml.

We claim:

1. A process for the production of low bulky density common salt, comprising mixing solid common salt with an aqeuous brine containing a wetting agent selected from the group consisting of a cationic surface-active agent of the formula $R(CH_3)_3N^+X^-$ where R is alkyl of from 12 to 16 carbon atoms and a cationic surface-active agent of the formula

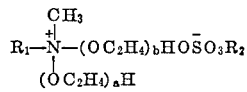

where $R_1$ is $C_{17}H_{35}$, $R_2$ is a member selected from the group consisting of methyl and ethyl and $a$ and $b$ each represents an integer less than 4, said wetting agent being soluble in said brine to give a clear solution having a reduced surface tension, the addition of the said common salt providing an excess above saturation, aerating the resulting mixture to form a suspension of said solid salt in an aqueous foam stabilised at least in part by said wetting agent and drying said foam.

2. A process as claimed in claim 1 in which the foam is subdivided into particles.

3. A process as claimed in claim 2 in which a humectant substance is applied on to the surface of the particulate low bulk density common salt formed.

4. A process as claimed in claim 3 in which said humectant substance is magnesium chloride.

5. A process as claimed in claim 3 in which from 0.05 to 1%, based upon the weight of the common salt, of humectant substance is applied.

6. A process as claimed in claim 1 in which the foam is formed into coherent masses.

7. A process as claimed in claim 1 in which said wetting agent comprises dodecyltrimethylammonium bromide.

8. A process as claimed in claim 1 in which said wetting agent comprises a compound of formula

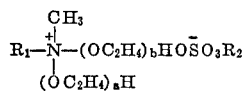

wherein $R_1$ is $C_{17}H_{35}$; $R_2$ is a methyl or ethyl group; and $a$ and $b$ each represents an integer less than 4.

9. A process as claimed in claim 1 in which said brine also includes gelatin.

10. A process as claimed in claim 9 in which said wetting agent is a cationic surface-active agent of the formula

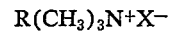

$$R(CH_3)_3N^+X^-$$

where R is a straight- or branched-chain alkyl group containing from 12 to 16 carbon atoms and X is a chloride or bromide ion.

11. A process as claimed in claim 10 in which said wetting agent is dodecyltrimethylammonium bromide.

References Cited

UNITED STATES PATENTS

| | | | |
|---|---|---|---|
| 1,950,459 | 3/1934 | Seifert | 23—303 |
| 2,222,330 | 11/1940 | Weinig | 23—312 |
| 3,271,106 | 9/1966 | Nylander | 23—312 |

NORMAN YUDKOFF, Primary Examiner.

S. J. EMERY, Assistant Examiner.

U.S. Cl. X.R.

23—89, 303; 252—304, 316